United States Patent
Katz et al.

(10) Patent No.: US 6,697,640 B1
(45) Date of Patent: Feb. 24, 2004

(54) METHOD AND APPARATUS FOR DIRECTIONAL RADIO COMMUNICATION

(75) Inventors: Marcus Katz, Oulu (FI); Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/612,762

(22) Filed: Jul. 10, 2000

Related U.S. Application Data (63) Continuation of application No. PCT/EP98/07259, filed on Nov. 11, 1998.

(51) Int. Cl.⁷ .................................................. H04M 1/00
(52) U.S. Cl. ........................... 455/561; 455/25; 455/68; 455/517; 455/562.1
(58) Field of Search ........................... 455/25, 19, 517, 455/561, 562, 68–69; 370/310, 324, 326, 328, 329, 334, 335, 336, 348, 351, 377, 312, 339; 342/357.05–357.01

(56) References Cited

U.S. PATENT DOCUMENTS

| | | | | |
|---|---|---|---|---|
| 5,483,676 A | * | 1/1996 | Mahany et al. | 455/67.4 |
| 5,515,378 A | * | 5/1996 | Roy, III et al. | 370/95.1 |
| 5,551,068 A | * | 8/1996 | Goldsmith et al. | 455/89 |
| 5,602,831 A | * | 2/1997 | Gaskill | 370/252 |
| 5,771,017 A | * | 6/1998 | Dean et al. | 342/374 |
| 5,884,187 A | * | 3/1999 | Ziv et al. | 455/522 |
| 5,893,033 A | * | 4/1999 | Keskitalo et al. | 455/437 |
| 5,894,598 A | * | 4/1999 | Shoki | 455/562 |
| 6,091,788 A | * | 7/2000 | Keskitalo et al. | 375/347 |
| 6,134,220 A | * | 10/2000 | Le Strat et al. | 370/252 |
| 6,289,005 B1 | * | 9/2001 | Katz | 370/328 |

FOREIGN PATENT DOCUMENTS

| | | |
|---|---|---|
| EP | 0869578 A1 | 10/1998 |
| FI | 941072 | 3/1994 |
| WO | WO 97/50272 | 12/1997 |

\* cited by examiner

*Primary Examiner*—Lee Nguyen
*Assistant Examiner*—Tuan Tran
(74) *Attorney, Agent, or Firm*—Squire, Sanders & Dempsey L.L.P.

(57) ABSTRACT

A method of directional radio communication between a first station and a second station comprises the steps of transmitting signals from the second station to the first station via a radio channel. At least one parameter indicative of the speed of change in the radio channel is measured. A rate with which the second station should send signals to the first station is determined from the at least one parameter and the second station sends signals to the first station with at least the rate.

17 Claims, 5 Drawing Sheets a) UUS in every frame

a) UUS in every frame

Fig.6b.

METHOD AND APPARATUS FOR DIRECTIONAL RADIO COMMUNICATION

This application is a continuation of PCT/EP98/07259 filed Nov. 11, 1998.

The present invention relates to a method and apparatus for directional radio communication between a first station and a second station. In particular, but not exclusively, the present invention is applicable to cellular communication networks using an antenna array in an adaptive manner, for example, space division multiple access networks.

With currently implemented cellular communication networks, a base transceiver station (BTS) transmits signals intended for a given mobile station (MS) which may be a mobile telephone, throughout a cell or a cell sector served by that base transceiver station. However, systems using adaptive antenna arrays such as space division multiple access (SDMA) systems have been proposed. In adaptive antenna array systems, the base transceiver station will not transmit signals intended for a given mobile station throughout the cell or cell sector covered by that base transceiver station but will only transmit the signal over a smaller proportion of the cell or cell sector. The direction in which a signal is transmitted to a given mobile station is usually determined in accordance with the direction from which a signal from the mobile station is received.

In some known cellular communication networks, it is common to have highly directional traffic. In other words, the base station or a mobile station will transmit far more information than it receives. For example, this can occur with packet radio networks. In packet radio networks, the data is transmitted to or from a mobile station in the form of packets. Accordingly, the time division duplex (TDD) mode has been proposed. Effectively, the same radio channel characteristic will be used for signals transmitted by the mobile station to the base transceiver station and also for those signals transmitted by the base transceiver station to the mobile station. The signals are not transmitted by the mobile station and the base transceiver station at the same time. In a time division multiple access (TDMA) system, certain of the slots in a frame will be used by a mobile station to transmit signals to a base transceiver station and the remaining slots will be used by the base transceiver station to transmit signals to the mobile station.

However, if in an adaptive antenna array system, there is highly directional traffic, regardless of whether or not the TDD mode is used, problems can occur. These problems occur if the base transceiver station is transmitting far more signals to the mobile station than the mobile station is sending to the base transceiver station. In particular, the base transceiver station needs to be able to determine the direction from which signals from a mobile station are received in order to determine the direction in which the base transceiver station should transmit signals to the mobile station. If, however, the mobile station is moving and is only transmitting signals irregularly to the base transceiver station, the base transceiver station is not able to properly track the position of the mobile station. The risk that the base transceiver station will transmit signals in the incorrect direction will increase.

This same situation also gives rise to problems in TDD modes of operation. The channel is regarded as being reciprocal. In other words, the channel behaviour in the direction of transmission of signals from the base transceiver station and to the mobile station are regarded as being equivalent. However, if the mobile station only infrequently transmits signals to the base transceiver station, the base transceiver station will not be able to deduce very much about the radio channel since it receives very little information from the mobile station. Accordingly, parameters of the signal transmitted by the base transceiver station, such as directional information of the signal path, which are dependent on information derived from signals received by the base transceiver station will only be updated infrequently. This can lead to a decrease in the network performance.

Reference is made to Finish Patent application No FI 941072 which is also in the name of the present applicant. This document discloses an arrangement in which the number of pilot symbols included in a channel is varied in accordance with the quality of the radio channel.

It is an aim of embodiments of the present invention to address these problems.

According to one aspect of the present invention, there is provided a method of directional radio communication between a first station and a second station, said method comprising the steps of transmitting signals from said second station to said first station via a radio channel; measuring at least one parameter indicative of the speed of change in said radio channel; determining from said at least one parameter a rate with which said second station should send signals to said first station; and causing said second station to send signals to said first station with at least said rate.

Thus, the rate at which the second station sends signals to the first station is determined from at least one parameter indicative of the speed of change of the radio channel. This improves the quality of the signals.

The method preferably includes a step of transmitting signals from the first station to the second station. More signals may be transmitted from the first station to the second station than are transmitted to the first from the second station. It is also possible that approximately the same number of signals be sent from the first station to the second station as from the second station to the first station. It is also possible that more signals may be transmitted from the second station to the first station than are transmitted from the first station to the second station.

The at least one parameter may be the speed of the second station relative to the first station and the measuring step may measure the speed of the second station relative to the first station. Alternatively or additionally, the at least one parameter may be the distance between the first and second stations and the measuring step may measure the distance between the first and second stations. Alternatively or additionally, the at least one parameter is the coherence time of the radio channel and the measuring step measures the coherence time of the channel. Alternatively or additionally, the at least one parameter may be the angular spread of the signal received by the first station from the second station and the measuring step measures said angular spread. Alternatively or additionally, said at least one parameter may be the height of an antenna array of the first station above the environment.

The rate may be proportional to (the speed of the second station×angular spread of the signal received from the second station by the first station)÷(the distance between the first and second stations×the coherence time of the channel). The rate is preferably higher with higher speeds of change in the channel.

The first and second stations may communicate using a time division multiple access method with frames divided into slots. The rate may be defined as one signal to be transmitted from the second station to the first station every n frames where n is an integer.

The first and second stations may use the same frequency range for the transmitted signals or alternatively may use different frequency ranges. A reference signal may be sent from the second station to the first station with the predetermined rate.

Preferably the second station is a mobile station and the first station is a base transceiver station.

According to a second aspect of the present invention, there is provided a first station for directional radio communication between with a second station, said first station comprising means for receiving signals transmitted from said second station to said first station via a radio channel; means for measuring at least one parameter indicative of the speed of change in said radio channel; means for determining from said at least one parameter a rate with which said second station should send signals to said first station; and means for transmitting said rate to said second station.

For a better understanding of the present invention and as to how the same may be carried into effect, reference will now be made by way of example to the accompanying drawings in which.

Figure 1:
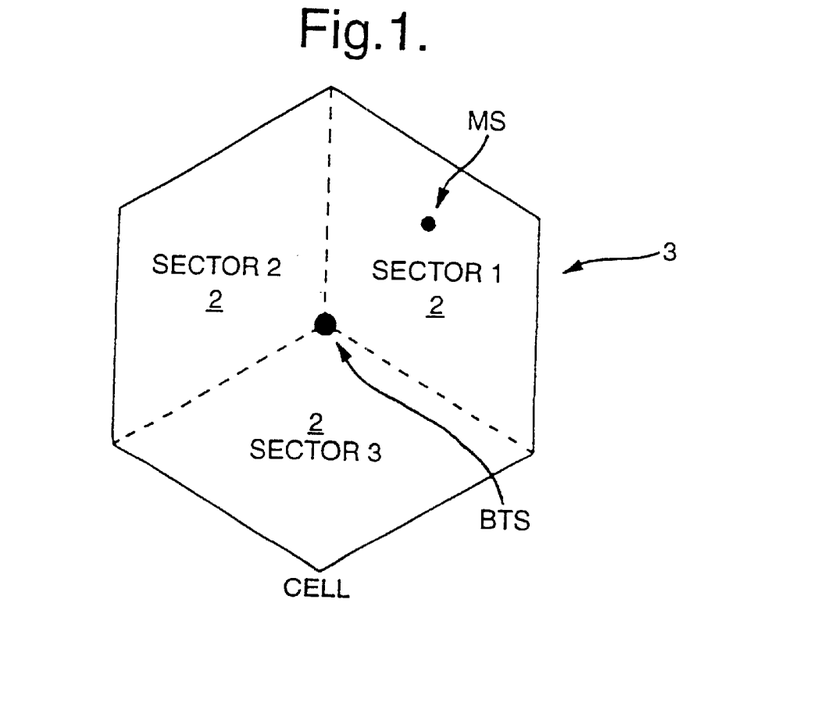
FIG. 1 shows a schematic view of base transceiver stations and the associated cell sectors.

Reference will first be made to FIG. 1 in which three cell sectors 2 defining a cell of a cellular mobile telephone network as shown. The three cell sectors 2 are served by respective base transceiver stations (BTS) 4. Three separate base transceiver stations are provided at the same location. Each BTS 4 has a separate transceiver which transmits and receives signals to and from a respective one of the three cell sectors 2. Thus, one dedicated base transceiver station is provided for each cell sector 2. Each BTS 4 is thus able to communicate with mobile stations (MS) such as mobile telephones which are located in respective cell sectors.

The present embodiment is described in the context of a time division multiple access (TDMA) system. In particular, embodiments of the present invention are described in the context of a TDD system. In a TDD system, the same frequency range is used for transmitting signals from the base transceiver station and from the mobile station. However, theses transmissions will take place in different time slots. In other words, the base station and the mobile station will not be transmitting at the same time.

Figure 2:
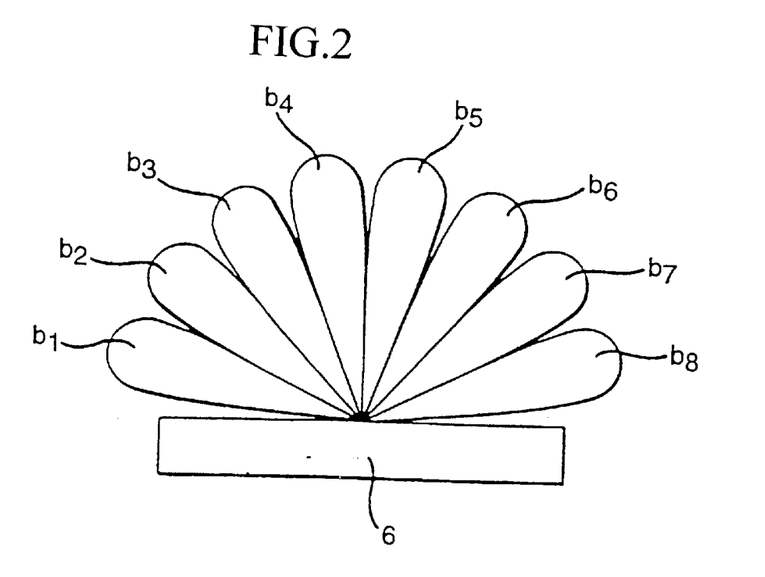
FIG. 2 shows a fixed beam pattern provided by an antenna array used by the base transceiver station of FIG. 1.
Figure 3:
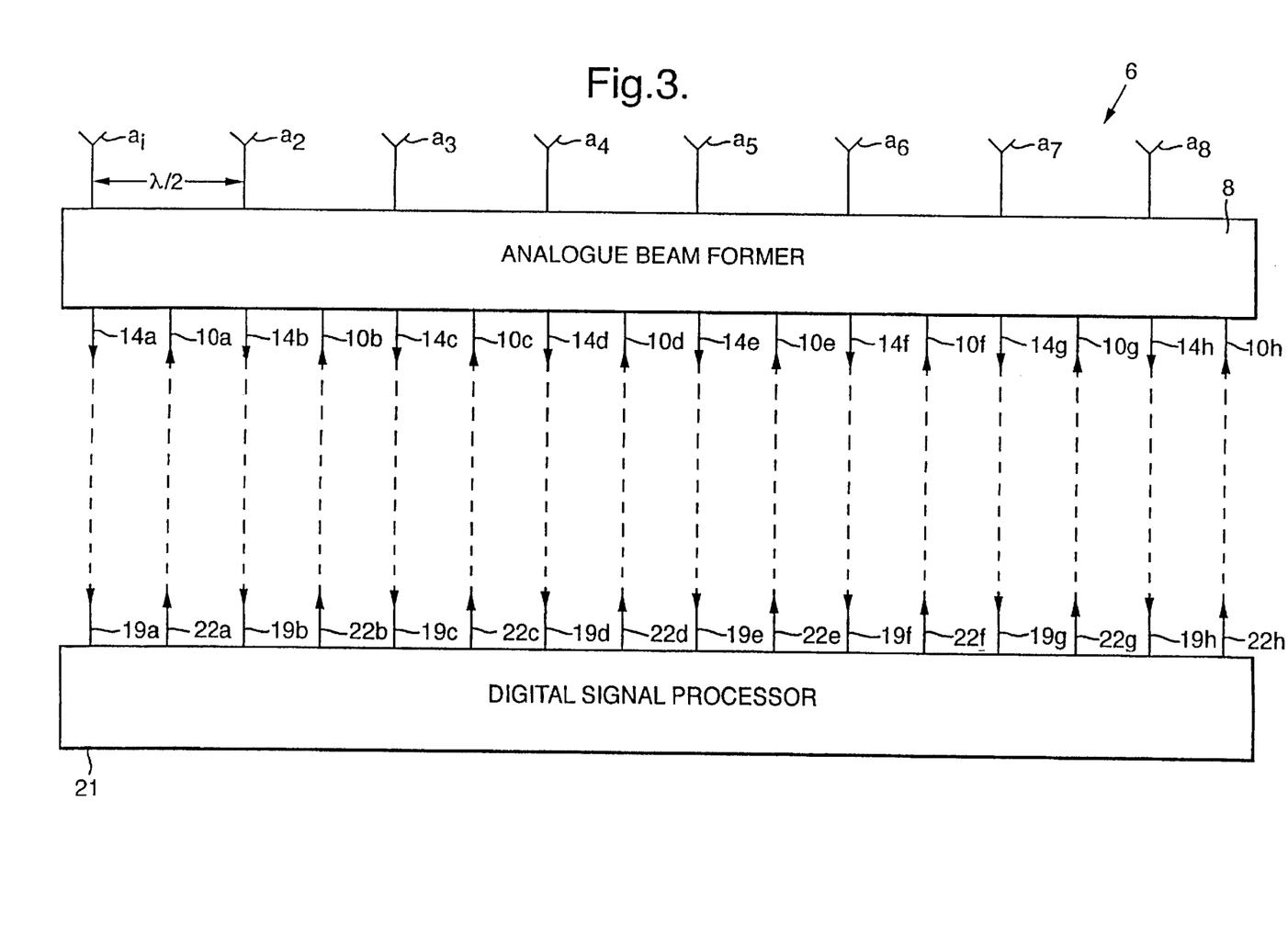
FIG. 3 shows a simplified representation of the antenna array of FIG. 1 and part of the base transceiver station.

FIG. 2 shows a schematic view of one antenna array 6 of one BTS 4 which acts as a transceiver. In the arrangement shown in FIGS. 2 and 3 an analogue beam former, such as a Butler matrix is used. However digital beam formers may alternatively be used. It should be appreciated that in the interests of clarity, a simplified representation of the components present is shown. In practice, far more components will be present. It should be appreciated that the array 6 shown in FIG. 2 only serves one of the three cell sectors 2 shown in FIG. 1. Another two antenna arrays 6 are provided to serve the other two cell sectors 2. The antenna array 6 has eight antenna elements $a_1 \ldots a_8$ as shown in FIG. 3. The elements $a_1 \ldots a_8$ are arranged typically to have a spacing of half a wave length between each antenna element and are arranged in a horizontal row in a straight line. Each antenna element $a_1 \ldots a_8$ is arranged to transmit and receive signals and can have any suitable construction. Each antenna element $a_1 \ldots a_8$ may be a dipole antenna, a patch antenna or any other suitable antenna. The eight antenna elements $a_1 \ldots a_8$ together define a phased array antenna 6.

As is known, each antenna element $a_1 \ldots a_8$ of the phased array antenna 6 is supplied with the same signal to be transmitted to a mobile station (MS). However, the phases of the signal supplied to the respective antenna elements $a_1 \ldots a_8$ are shifted with respect to each other. The differences in the phase relationship between the signal supplied to the respective antenna elements $a_1 \ldots a_8$ gives rise to a directional radiation pattern. Thus, a signal from the BTS 4 may only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element $a_1 \ldots a_8$. The directional radiation pattern which can be achieved with the antenna array 6 is shown in FIG. 2. Thus, the antenna array 6 can be controlled to provide a beam $b_1 \ldots b_8$ in any one of the eight directions illustrated in FIG. 2. For example, the antenna array 6 could be controlled to transmit a signal to an MS only in the direction of beam $b_5$ or only in the direction of beam $b_6$. It is also possible to control the antenna array to transmit a signal in more than one beam direction at the same time. For example, a signal may be transmitted in the two directions defined by beams $b_5$ and $b_6$ at the same time. It should be appreciated that FIG. 2 is only a schematic representation of the eight possible beam directions which could be achieved with the antenna array 6 controlled by the analogue beam former. In practice, it should be noted that there will in fact be an overlap between adjacent beams to ensure that all of the sector 2 is served by the antenna array 6.

Detailed reference will now be made to FIG. 3 which shows a simplified representation of the antenna array 6 and part of the base transceiver station.

The relative phase of the signal provided at each antenna element $a_1 \ldots a_8$ is controlled by the analogue beam former which may be Butler matrix circuitry 8 so that a signal can be transmitted in the desired beam directions. The Butler matrix circuitry 8 thus provides a phase shifting function. The Butler matrix circuitry 8 has eight inputs 10a–h from the base transceiver station and eight outputs 14a–h to the base transceiver station, one for each antenna element $a_1 \ldots a_8$. The signals received by the respective inputs 10a–h comprise the signal to be transmitted. Each of the eight inputs 10a–h represents the beam direction in which a given data burst can be transmitted. For example, if the Butler matrix circuitry 8 receives a signal on the first input 10a, the Butler matrix circuitry applies the signal provided on input 10a to each of the antenna elements $a_1 \ldots a_8$ with the required phase differences to cause beam $b_1$ to be produced so that the signal is transmitted in the direction of $b_1$. Likewise, a signal provided on input 10b causes a beam in the direction of beam $b_2$ to be produced and so on.

A signal transmitted by a mobile station to a BTS 4 will generally be received by each of the eight antenna elements $a_1 \ldots a_8$. However, there will be a phase difference between each of the signals received by the respective antenna elements $a_1 \ldots a_8$. The Butler matrix circuitry is therefore able to provide an indication from the relative phases of the signals received by the respective antenna elements $a_1 \ldots a_8$ the direction from which a signal has been received. The Butler matrix circuitry 8 thus has eight inputs, one from each of the antenna elements $a_1 \ldots a_8$ for the signal received by each antenna element. Each of the eight outputs of the Butler matrix circuitry 14a–h corresponds to a particular direction from which a given signal is received from the mobile station. For example, if the antenna array 6 receives a signal from a mobile station in the direction of beam b1, then the Butler matrix circuitry 8 will output the received signal on output 14a and so on.

In summary, the analogue beam former 8 will receive on the antenna elements $a_1 \ldots a_8$ eight versions of the same signal which are phase shifted with respect to one another. From the relative phase shifts, the Butler matrix circuitry 8 allows the direction from which a signal has been received from a mobile station to be determined simply.

It should be appreciated that in some environments, a single signal from a mobile station may appear to come from more than one direction due to for example reflection of the signal, provided that the angular spread of the multipath component is wide. The Butler matrix circuitry will provide a signal on each output 14a–h corresponding to each of the directions from which a given signal appears to come. However, it should be appreciated that the signals provided on more than one output 14a–h may be time delayed with respect to each other.

Each output 14a–h of the Butler matrix circuitry 8 is connected to a respective input 19a–h of a digital signal processor 21. Between the output of the Butler matrix circuitry 8 and the input to the digital signal processor 21, the signals may be processed and for example be amplified, reduced to the base band frequency and/or converted to digital form. Each input 10a–h to the Butler matrix circuitry is connected to a respective output 22a–h of the digital signal processor 21. The signals output by the digital signal processor 21 may be further processed. For example, the output of the signal processor 21 may be converted to analogue form, converted from the base band frequency to the radio frequency and/or be amplified.

It should be appreciated that the output of the digital signal processor 21 which is selected represents the beam direction in which a signal is to be transmitted.

Figure 4:
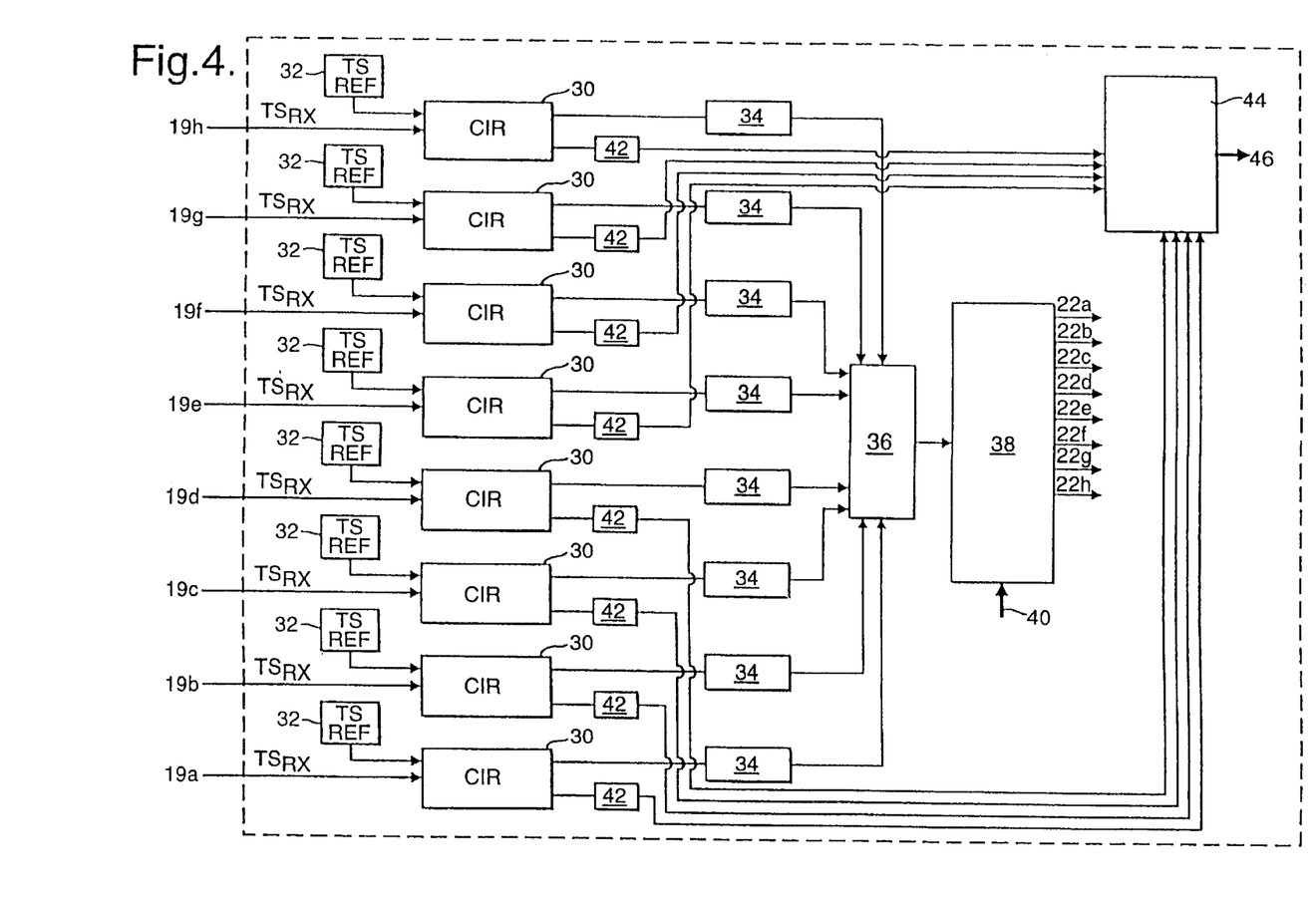
FIG. 4 shows a schematic view of the digital signal processor of FIG. 3.

Reference will now be made to FIG. 4 which schematically illustrates the digital signal processor 21. It should be appreciated that the various blocks illustrated in FIG. 4 do not necessarily correspond to separate elements of an actual digital signal processor 21 embodying the present invention. Rather, the various blocks illustrated in FIG. 4 corresponds to functions carried out by the digital signal processor 21. In one preferred embodiment of the present invention, the digital signal processor 21 is at least partially implemented in integrated circuitry and several functions may be carried out by the same element.

Each signal received by the digital signal processor 21 on the respective inputs 19a–h is input to respective channel impulse response (CIR) estimator block 30. The CIR estimator block 30 includes memory capacity in which the received signal is temporarily stored and also memory capacity for storing the estimated channel impulse response. The channel impulse response estimator block 30 is arranged to calculate the channel impulse response of the channel of the respective input 19a–h. An associated channel can be defined for a given signal transmitted. in a given frequency band, in an allocated time slot and the direction from which the signal is received. The direction from which a signal is received is, as mentioned hereinbefore, ascertained by the analogue beam former 8 so that a signal received at input 19a of the digital signal processor 21 represents beam $b_1$ and so on. It should be appreciated that the signal received at a given input may also include the side lobes of the signal received on, for example, adjacent inputs.

Each signal which is transmitted from a mobile station MS to the BTS 4 includes a reference signal which, in a TDMA system may be a training sequence TS. In CDMA systems, the reference signal may comprise pilot symbols. However, the training sequence $TS_{RX}$ which is received by the BTS 4 is effected due to noise and also due to multipath effects which leads to interference between adjacent bits of the training sequence. This latter interference is known as intersymbol interference. $TS_{RX}$ may also be effected by interference from other mobile stations. As mentioned hereinbefore, a given signal from the mobile station may follow more than one path to reach the BTS and more than one version of a given signal may be detected by the antenna array from a given direction. The training sequence $TS_{RX}$ which is received from input 19a is cross correlated by the CIR estimator block 30 with a reference training sequence $TS_{REF}$ stored in a data store 32. The reference training sequence $TS_{REF}$ is the same as the training sequence which is initially transmitted by the mobile station. In practice, the received training sequence $TS_{RX}$ is a signal modulated onto a carrier frequency while the reference training sequence $TS_{REF}$ is stored as a bit sequence in the data store 32. Accordingly, before the cross correlation is carried out, the stored reference training signal is similarly modulated. In other words, the distorted training sequence received by the BTS 4 is correlated with the undistorted version of the training sequence. In an alternative embodiment of the present invention, the reference training sequence is demodulated prior to its correlation with the reference training sequence.

The reference training sequence $TS_{REF}$ and the received training sequence $TS_{RX}$ are each of length L corresponding to L bits of data. The exact location of the received training sequence $TS_{RX}$ within the allocated time slot may be uncertain. This is because the distance from the mobile station MS from the BTS 4 will influence the position of the data burst sent by the mobile station within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n will be an odd number of the order of 7 or 9. The n correlations will typically be on either side of a maximum attained correlation. The relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations give rise to a tap sequence having n values.

Figure 5:
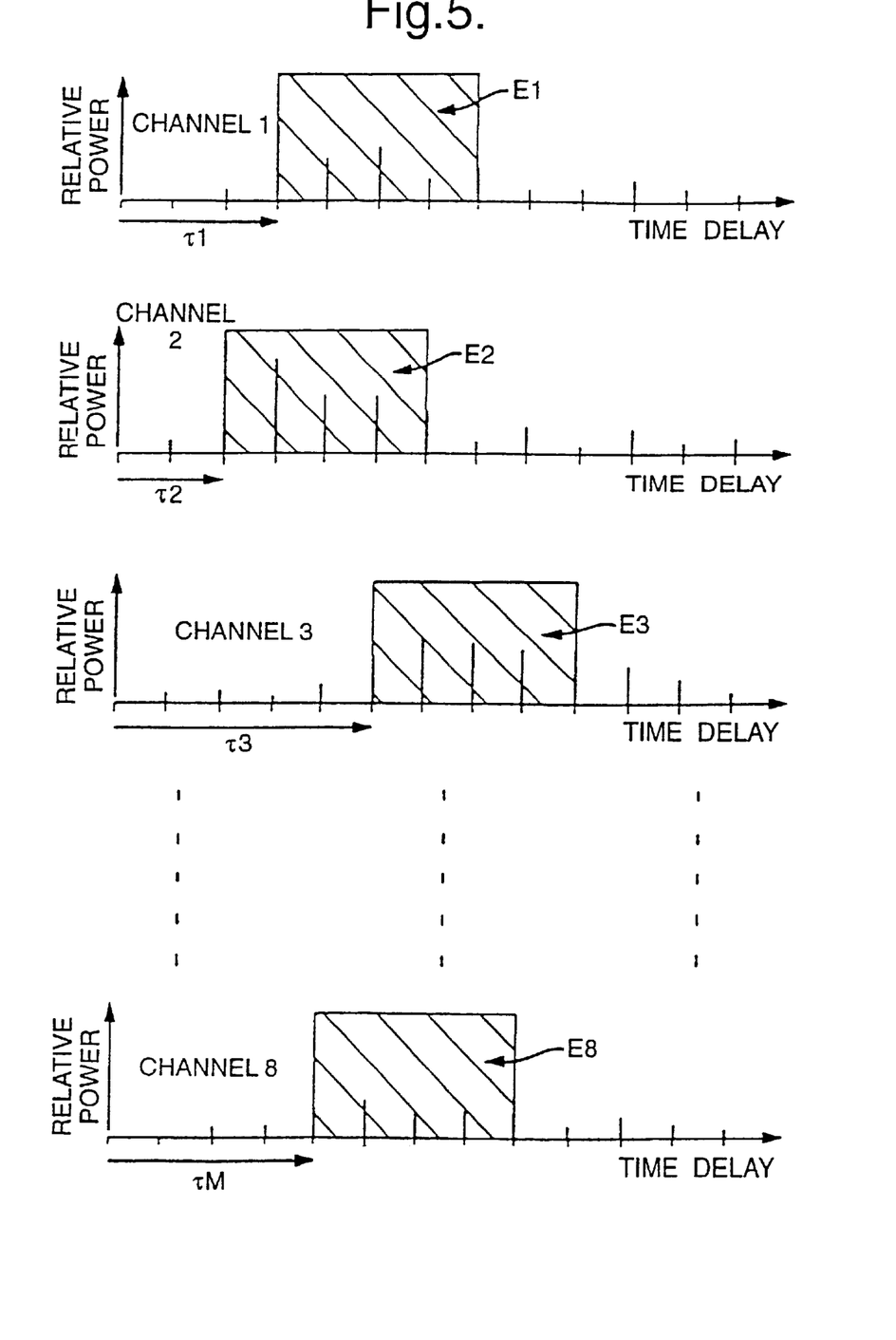
FIG. 5 illustrates the channel impulse response for four channels out of eight channels.

Reference is now made to the FIG. 5 which shows the channel impulse response for four of the eight possible channels corresponding to the eight spacial directions. In other words, FIG. 5 shows a channel impulse response for four channels corresponding to a given data burst received in four of the eight beam directions from the mobile station. The x axis of each of the graphs is a measure of time delay whilst the y axis is a measure of the relative power. Each of the lines (or taps) marked on the graph represents the multipath signal received corresponding to a given correlation delay. Each graph has n taps, one tap corresponding to each correlation.

From the estimated channel impulse response, it is possible to determine the location of the training sequence within the allotted time slot. The largest tap values will be obtained from the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. These five values are selected as representative of the channel impulse response of that channel. The maximum energy for a given channel is calculated as follows:

$$E = \sum_{j=1}^{5} (h_j)^2$$

where h represents a tap amplitude resulting from a cross correlation. The CIR estimator block 30 estimates the maximum energy for a given channel by using a sliding window technique.

The energy can be regarded as being a measure of the strength of the desired signal from a given MS received by the BTS 4 from a given direction. This process is carried out for each of the eight channels which represent the eight different directions from which the same data burst could be received. The signal which is received with the maximum energy can be regarded as being the signal which has followed the path with a minimum attenuation.

An analysis block 34 is connected to each CIR estimator block 30 which stores the maximum energy calculated by the respective CIR estimator block 30. Each analysis block is also arranged to determine the position of the beginning of the window determining the five values providing the maximum energy for each channel. The time delay is then determined based on the time between a reference point and the beginning of the window. That reference point may be the time when the training sequence in each branch start to be correlated, the time corresponding to the earliest window edge of all of the branches or a similar common point. In order to accurately compare the various delays to the different channels, a common timing scale is adopted which relies on the synchronisation signal provided by the BTS in order to control the TDMA mode of operation. In other words, the position of the received training sequence $TS_{RX}$ in the allotted time slot is a measure of the time delay.

In GSM (Global System for Mobile communications) systems, the delay for a given channel is calculated in order to provide timing advance information. Timing advance information is used to ensure that a signal transmitted by the mobile station to the BTS falls within its allotted time slot. The timing advance information can be determined based on the calculated relative delay and the current timing advance information. If the mobile station MS is far from the base station, then the mobile station will be instructed by the BTS to send its signal earlier than if the mobile station MS is close to the BTS.

The results of the analysis carried out by each of the analysis blocks 34 are input to a comparison block 36. The comparison block 36 is arranged to determine the direction in which a signal is to be transmitted from the BTS to the mobile station. Any suitable criteria for determining this can be used. The comparison block for example can ascertain which channel has the maximum energy for a given signal. This means that the beam direction from which the strongest version of a signal is received can be ascertained. That direction can then be used by the base transceiver station to transmit signal to that mobile station. Alternatively or additionally, the comparison block 36 can also ascertain which of the channels has a minimum delay. In other words the channel having the signal which has followed the shortest path could be ascertained. The associated beam direction can then be used to transmit signals from the base transceiver station to the mobile station.

The comparison block 36 may determine the two beam directions with the strongest signals and those may be used by the base transceiver station to transmit signals to the mobile station. In fact, any of a number of suitable different criteria can be applied by the comparison block 36 to select the or each beam direction in which a signal should be transmitted by the base transceiver station to the mobile station.

Thus, the comparison block 36 determines the or each beam direction in which a signal is to be transmitted from the base transceiver station to the mobile station. The timing advance information associated with a given channel is calculated by the respective analysis block 34. Thus, an estimate of the distance between the base transceiver station and the mobile station can be determined from the timing advance information for the channel where the signal has followed the shortest path. In some environments, the distance between the base transceiver station and mobile station can be regarded as being a measure of the stability of directional information or direction of arrival of the channel. In other words, the greater the distance between the mobile station and the base transceiver station, the less likely that abrupt changes will occur in the directional information or direction of arrival of the channel. In other words, when the base transceiver station and the mobile station are close together, small changes in the distance therebetween can have a relatively large effect on the directional information or direction of arrival of the channel. However, when the distance between the BTS and the mobile station is relatively large, changes in the BTS-MS distance have a much smaller effect on the directional information or direction of arrival of the channel.

The comparison block 36 is arranged to determine the angular spread of the received signal. In other words, the comparison block 36 determines the number of different directions in which the signal received from the mobile station has an energy level above a threshold energy level. Generally, a narrow angular spread indicates that the mobile station is relatively far from the base transceiver station and/or the base station antenna array is well above the surrounding environment. Conversely, a wide angular spread generally indicates that the mobile station is relatively far from the base transceiver station and/or the base station antenna array is at a low level with respect to the surroundings. If it is determined that the angular spread is narrow, for example that the signal is received only over one or two beam widths, then the direction in which the base transceiver station should transmit signals to the mobile station is selected in accordance with the beam directions determined by the comparison block 36. However, if a broad angular spread is determined, for example if the angular spread is over several beam directions, then the downlink beam selection is not trivial in FDD systems. In TDD systems using, for example, digital beam forming, both uplink and downlink channels are known which makes the downlink beam forming more efficient.

The comparison block 36 is also arranged to determine the coherence time of the or each channel where the signal exceeds the threshold energy level. The coherence time of a channel is the interval over which a transmitted symbol will be relatively undisturbed by fluctuations in the channel. As discussed previously, fluctuations in the channel are caused by movement of the mobile station, which may itself be moving or by changes in the radio environment. The coherence time is inversely proportional to the Doppler spread. The Doppler spread and hence the coherence time can be estimated from the measurements of the speed of the mobile station or from counting the number of deep fades in the mobile signal in a predetermined period of time. Deep fades are when the mobile signal quality falls below a threshold value. Generally, the faster that a mobile station moves, the more frequently that deep fades occur.

The comparison block 36 also estimates the mobile station speed which gives a measure of the changes in the direction of arrival of the signals at the base transceiver station and also of changes in the channel itself. The mobile station speed can be estimated in a number of different ways, for example by counting the number of fading deeps in any given time or from the direction of arrival evolution in time. In the latter case, the change in the direction of arrival overtime can give a measure of the mobile station speed. The same information can be used to determine mobile station speed and the Doppler spread.

The comparison block 36 is arranged to determine an uplink update signalling (UUS) rate. The UUS rate is the frequency with which the mobile station should transmit updating information to the BTS to allow the BTS to determine the beam direction in which signals should be transmitted to the mobile station with a reasonable amount of accuracy and also to set other channel parameters such as complex channel impulse response in a TDD system and direction of arrival in a FDD system.

The UUS rate is calculated using the following equation:

$$USS \text{ rate} = K \frac{MS \text{ speed} \times \text{angular spread}}{BTS\text{-}MS \text{ distance} \times \text{coherence time} \times \text{antenna height}}$$

where K is a constant and antenna height is the height of the antenna array of the base station above the surrounding environment.

Thus, the UUS rate is related to how quickly the radio channel changes. In particular, the faster that the radio channel changes, the higher the UUS rate. Likewise, the lower the UUS rate, the less quickly that the radio channel changes.

In one embodiment of the present invention, the base transceiver station will transmit information concerning the UUS rate to the mobile station. In accordance with this rate, uplink update signals will be sent from the mobile station to the base transceiver station at time intervals indicated by the uplink update signalling rate. This uplink update signal may simply comprise the training sequence or a portion thereof.

Figure 6A:
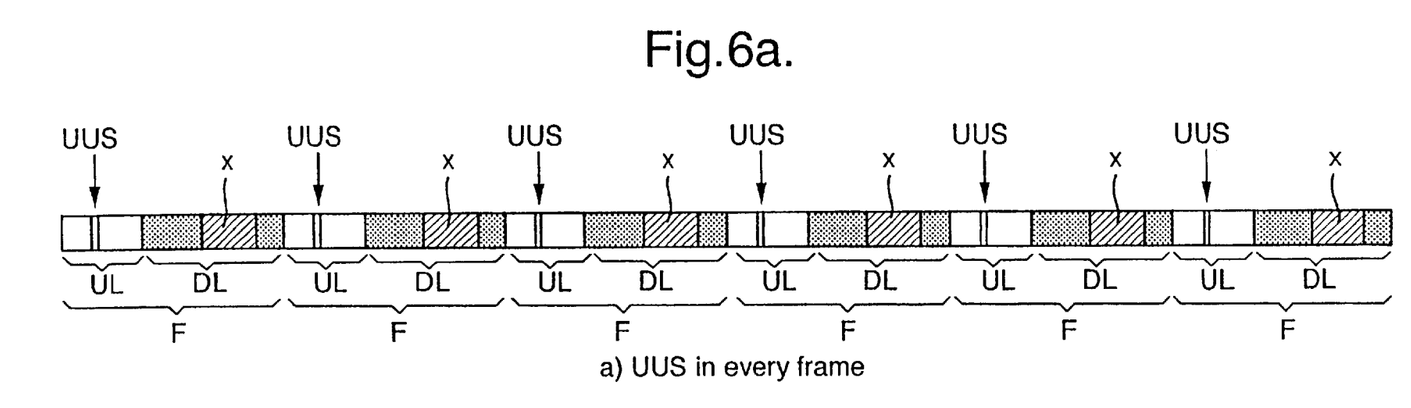
FIGS. 6a and 6b show the frequency of the uplink update signals in a rapidly changing channel and a less rapidly changing channel respectively.
Figure 6B:
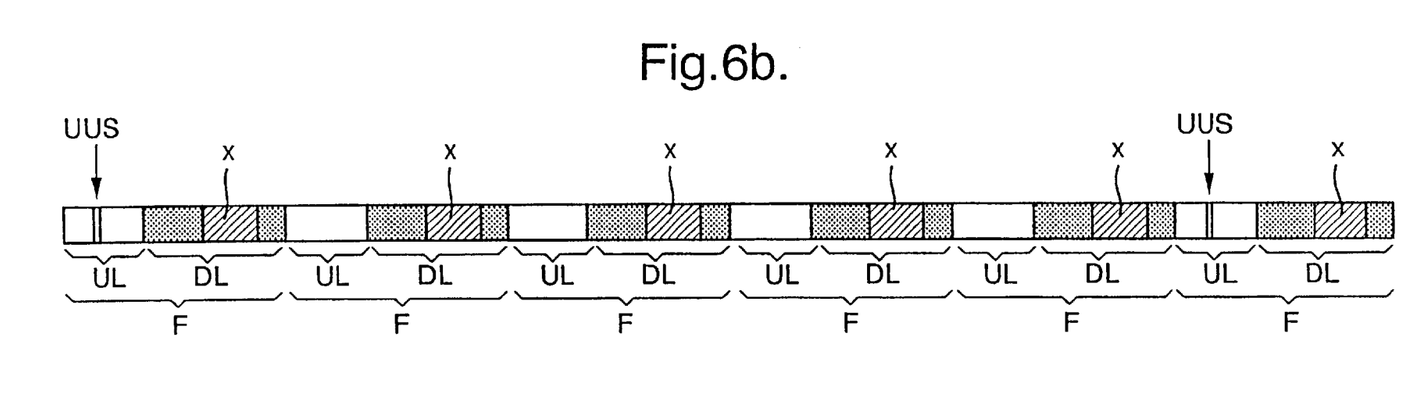

Reference is now made to FIGS. 6a and 6b. FIG. 6a shows a plurality of TDD frames F where the base transceiver station is servicing a particular mobile station, mainly in the downlink direction. In other words, the base transceiver station sends more information to the mobile station than it receives therefrom. Each frame is marked F and the part of the frame allocated for communication from the mobile station to the base transceiver station is referenced UL whilst the part of each frame allocated for the transmission of signals from the base transceiver station to the mobile station is referenced DL.

The portion of each frame marked X represents the data which is transmitted by the BTS to the mobile station. The remaining part of the downlink portion of each frame is used to provide information such as synchronising information etc. As can be seen from FIG. 6a, an uplink update signal is provided by the mobile station in every frame, regardless of whether or not any other information is transmitted by the mobile station to the base transceiver station. In some applications, it is not unknown for the uplink portion of each frame to remain unused for a number of consecutive frames. However, in embodiments of the present invention, the uplink update signal is, if required, provided in each frame. The uplink update signal will be provided in each frame if the channel is changing rapidly, for example if the mobile station is moving quickly.

In FIG. 6b, each frame F is again divided into a uplink portion UL and a downlink portion DL. However, the update signalling rate is much lower than in the example shown in FIG. 6a. In particular, the channel is not changing very quickly and accordingly an uplink update signal is provided by the mobile station every six frames.

In an alternative embodiment of the present invention, the comparison block 36 determines how often the base transceiver station receives information from the mobile station. If the determined rate is less than the UUS rate, signals are sent to the mobile station requesting uplink update signals. However, if the determined rate is greater than the required UUS rate, then the mobile station will not be required to send the uplink update signals.

The above mentioned embodiment has been described in the context of a TDD system. However it should be appreciated that in other embodiments of the invention, a FDD (frequency division duplex) mode can be used. In a FDD mode of operation one frequency range is used by the BTS to transmit signals to the mobile station and a different frequency range is used by the mobile station to transmit signals to the base transceiver station.

In the embodiment described hereinbefore, the BTS determines the UUS rate for the mobile station. However it is also possible that the mobile station could calculate its own UUS rate using the same principle as outlined hereinbefore.

It should be appreciated that the function of the base transceiver station described hereinbefore can additionally or alternatively be incorporated in the mobile station.

Embodiments of the present invention can also be used with fixed, stationary terminals as well as or instead of mobile terminals. In some embodiments the base station may be moving but preferably the base station will be stationary.

The embodiment described above used an analogue beam former. However it should be appreciated that the analogue beam former can be replaced by any other suitable analogue or digital beam forming circuitry. Some types of digital beamformer will allow the size and number of beams to be varied as required.

Whilst the present invention has been described in the context of a TDMA system, embodiments of the present invention can be used with any other suitable accessing method such as code division multiple access, frequency division multiple access or hybrids of any of those types of access methods.

It should be appreciated that whilst embodiments of the present invention have been described in the context of a cellular telecommunications network, embodiments of the present invention can also be used in other environments which require directional radio communication such as PMR (Private Mobile Radio and the like)

What is claimed is:

1. A method of directional radio communication between a first station and a second station, said method comprising the steps of:
   transmitting signals from a second station to a first station via a radio channel;
   transmitting signals from said first station to said second station;
   determining a direction for transmitting the signals from said first station to said second station based on the signals transmitted from the second station to the first station;
   measuring at least one parameter indicative of a rate of change in a characteristic of said radio channel;
   determining from said at least one parameter a determined rate with which said second station transmits signals to said first station such that said direction can be determined; and
   causing said second station to transmit signals to said first station with at least said determined rate.

2. The method as claimed in claim 1, wherein more signals are transmitted form the first station to said second station than are transmitted to said first from said second station.

3. The method as claimed in claim 1, wherein said determined rate is higher with higher speeds of change in said radio channel.

4. The method as claimed in claim 1, wherein said first and second stations communicate using a time division multiple access method with frames divided into slots.

5. The method as claimed in claim 1, wherein the first and second stations use a same frequency range for transmitting the signals.

6. The method in claim 1, wherein the first and second stations use different frequency ranges to transmit the signals.

7. The method as claimed in claim 1, wherein a reference signal is sent from the second station to said first station with said determined rate.

8. The method as claimed in claim 1, wherein the second station is a mobile station.

9. The method as claimed in claim 1, wherein said first station is a base transceiver station.

10. A first station for directional radio communication between a second station, said first station comprising:
    means for receiving signals transmitted from a second station to a first station via a radio channel;
    means for transmitting signals to said second station;
    means for determining a direction for transmitting the signals to said second station based on the signals received from the second station;
    means for measuring at least one parameter indicative of a rate of change in a characteristic of said radio channel;
    means for determining from said at least one parameter a determined rate with which said second station transmits signals to said first station such that said direction can be determined; and
    means for transmitting said determined rate to said second station.

11. A method of directional radio communication between a first station and a second station, said method comprising the steps of:
    transmitting signals from a second station to a first station via a radio channel;
    transmitting signals from said first station to said second station;
    determining a direction for transmitting the signals from said first station to said second station based on the signals transmitted from the second station to the first station;
    measuring at least one parameter indicative of a rate of change in a characteristic of said radio channel, wherein the at least one parameter is a speed of the second station relative to the first station and said measuring step measures the speed of the second station relative to the first station;
    determining from said at least one parameter a determined rate with which said second station transmits the signals to said first station; and
    causing said second station to transmit the signals to said first station with at least said determined rate.

12. A method of directional radio communication between a first station and a second station, said method comprising the steps of:
    transmitting signals from a second station to a first station via a radio channel;
    transmitting signals from said first station to said second station;
    determining a direction for transmitting the signals from said first station to said second station based on the signals transmitted from the second station to the first station;
    measuring at least one parameter indicative of a rate of change in a characteristic of said radio channel, wherein the at least one parameter is a distance between the first and second stations and said measuring step measures the distance between the first and second stations;
    determining from said at least one parameter a determined rate with which said second station transmits the signals to said first station; and
    causing said second station to transmit the signals to said first station with at least said determined rate.

13. A method of directional radio communication between a first station and a second station, said method comprising the steps of:
    transmitting signals from a second station to a first station via a radio channel;
    transmitting signals from said first station to said second station;
    determining a direction for transmitting the signals from said first station to said second station based on the signals transmitted from the second station to the first station;
    measuring at least one parameter indicative of a rate of change in a characteristic of said radio channel, wherein the at least one parameter is a coherence time of the radio channel and the measuring step measures the coherence time of said radio channel;
    determining from said at least one parameter a determined rate with which said second station transmits the signals to said first station; and
    causing said second station to transmit the signals to said first station with at least said determined rate.

14. A method of directional radio communication between a first station and a second station, said method comprising the steps of:
    transmitting signals from a second station to a first station via a radio channel;

measuring at least one parameter indicative of a rate of change in a characteristic of said radio channel, wherein the at least one parameter is an angular spread of the signals received by the first station from the second station and the measuring step measures said angular spread;

determining from said at least one parameter a determined rate with which said second station transmits the signals to said first station; and causing said second station to transmit the signals to said first station with at least said determined rate.

15. A method of directional radio communication between a first station and a second station, said method comprising the steps of:

transmitting signals from a second station to a first station via a radio channel;

measuring at least one parameter indicative of a rate of change in a characteristic of said radio channel, wherein the at least one parameter is a height of an antenna array of the first station above an environment;

determining from said at least one parameter a determined rate with which said second station should transmit the signals to said first station; and causing said second station to transmit the signals to said first station with at least said determined rate.

16. A method of directional radio communication between a first station and a second station, said method comprising the steps of:

transmitting signals from a second station to a first station via a radio channel;

measuring at least one parameter indicative of a rate of change in a characteristic of said radio channel;

determining from said at least one parameter a determined rate with which said second station transmits the signals to said first station, wherein the determined rate is proportional to:

(the speed of the second station)×(angular spread of the signal received from the second station by the first station)/(the distance between the first and second stations)×(the coherence time of said channel); and causing said second station to transmit the signals to said first station with at least said determined rate.

17. A method of directional radio communication between a first station and a second station using a time division multiple access method with frames divided into slots, said method comprising the steps of:

transmitting signals from a second station to a first station via a radio channel;

transmitting signals from said first station to said second station;

determining a direction for transmitting the signals from said first station to said second station based on the signals transmitted from the second station to the first station;

measuring at least one parameter indicative of a rate of change in a characteristic of said radio channel;

determining from said at least one parameter a determined rate with which said second station transmits the signals to said first station, wherein said determined rate is defined as one signal to be transmitted from said second station to said first station is, I an integer; and causing said second station to transmit the signals to said first station with at least said determined rate.

* * * * *